US006365862B1

(12) United States Patent
Miller et al.

(10) Patent No.: US 6,365,862 B1
(45) Date of Patent: Apr. 2, 2002

(54) ERGONOMIC METHOD FOR SORTING AND SWEEPING MAIL PIECES

(75) Inventors: Cheryl C. Miller, Ellicott City, MD (US); Eddie Kin Hang Lui, Euless, TX (US)

(73) Assignee: Siemens ElectroCom, L.P., Arlington, TX (US)

( * ) Notice: Subject to any disclaimer, the term of this patent is extended or adjusted under 35 U.S.C. 154(b) by 0 days.

(21) Appl. No.: 09/627,609

(22) Filed: Jul. 28, 2000

Related U.S. Application Data

(60) Provisional application No. 60/146,587, filed on Jul. 30, 1999.

(51) Int. Cl.[7] .............................. B07C 5/00; G06K 9/00

(52) U.S. Cl. ........................................ 209/584; 209/900

(58) Field of Search ................................. 209/509, 552, 209/584, 900

(56) References Cited

U.S. PATENT DOCUMENTS

| | | | | |
|---|---|---|---|---|
| 4,641,753 A | | 2/1987 | Tamada | 209/546 |
| 5,031,223 A | | 7/1991 | Rosenbaum et al. | 382/1 |
| 5,097,959 A | | 3/1992 | Tilles et al. | 209/584 |
| 5,097,960 A | | 3/1992 | Tilles et al. | 209/584 |
| 5,215,428 A | | 6/1993 | Masini | 414/789.5 |
| 5,893,464 A | | 4/1999 | Kiani et al. | 209/584 |
| 5,998,753 A | * | 12/1999 | Darchis et al. | 209/584 |
| 6,054,666 A | * | 4/2000 | Yamashita et al. | 209/583 |
| 6,107,588 A | * | 8/2000 | De Leo et al. | 209/584 |

FOREIGN PATENT DOCUMENTS

| | | | |
|---|---|---|---|
| JP | 5-116761 | 5/1993 | B65G/58/03 |

* cited by examiner

*Primary Examiner*—Donald P. Walsh
*Assistant Examiner*—Mark J. Beauchaine
(74) *Attorney, Agent, or Firm*—Philip G. Meyers Intellectual Property Law, P.C.

(57) ABSTRACT

In a process for sorting mail pieces according to the invention using a priori or first sort pass derived information, a sorting machine is used having a first array of pockets and a second array of pockets physically separate from the first array of pockets. The first and second arrays are swept of mail pieces by separate sweepers. The number of mail pieces sorted to each array are equalized in order to equalize the volume of mail pieces swept by each sweeper. In particular, where each pocket corresponds to a destination code and a total number of mail pieces per destination code is known in advance for each sort scheme to be carried out on the sorting machine, the equalizing step involves assigning destination codes to specific pockets to different sweeper zones in a manner that equalizes the volume of mail pieces swept by each sweeper. Mail is then swept from the pockets to trays stored on a vertically and horizontally extending rack having rows and columns of compartments containing trays. The number of mail pieces associated with each destination code in the sort scheme is determined, and destination codes are assigned to pockets and to trays at specific positions on the rack in a manner that minimizes the amount of vertical travel in sweeping sorted mail from the pockets. These improvements in combination improve the ergonomic aspects of the sorting process, when human or robotic sweepers are used.

11 Claims, 2 Drawing Sheets

ERGONOMIC METHOD FOR SORTING AND SWEEPING MAIL PIECES

This application is a conversion of provisional application Serial No. 60/146,587, filed Jul. 30, 1999, and relied upon for priority.

TECHNICAL FIELD

The present invention relates to a sorting process for sorting mail pieces and, in particular, to a sorting process wherein mail pieces sorted to an array of pockets are swept and transferred to trays for further processing.

BACKGROUND OF THE INVENTION

With a growing number of mail pieces being processed, it is becoming increasingly important to provide efficient processes for sorting the mail pieces. In general, one large sorting machine is used to sort the mail for delivery to various geographic locations. Typically, the mail pieces are sorted according to a sort scheme into numerous groups (e.g. any range of ZIP codes, including 1, 3, 5, 9, 11 most significant digit sort groups, or combinations of them). The United States Postal Service gives more monetary discounts to a mailing that has a finer resolution of sortation (i.e. postal carrier route level). As such, with existing finite sized sorting machines, a large number of sort schemes and sorts will be required to properly sort the mail pieces to the resolution dictated and for carrier route qualified mail.

One known process of sorting mail utilizes a large sorting machine performing numerous sorts according to a sort scheme. A batch of mail pieces are fed into the sorting machine with the address or bar code (or both) of each mail piece being read. The sorting machine directs each mail piece into an appropriate destination "pocket" or "bin" in accordance with the sort scheme. After the entire batch is sorted with each mail piece sorted into a particular pocket, the sweeper then removes or "sweeps" the mail pieces. During the sweeping process, all the mail pieces in the pockets are removed from the pockets. After completion of the sweeping process, a new batch of mail pieces can be sorted.

U.S. Pat. No. 5,893,464 describes a sorting process which includes the step of sorting, during a first time frame and in accordance with a first scheme, a first batch of mail pieces into a first array of pockets of the sorting machine. After the first batch of mail pieces is sorted according to the first sort scheme, the sorted mail pieces are swept from the first array of pockets of the sorting machine during a second time frame. During the second time frame, a second batch of mail pieces is sorted into a second array of pockets in accordance with a second scheme. Such a sorting system minimizes or reduces the amount of time the sorting machine is not in operation (sorting mail pieces to the pockets) and increases efficiency by minimizing the amount of time that the sorting machine is not processing mail.

However, such a system does not necessarily provide for optimum use of human workers or robotic units which must be used to sweep the pockets. Typically, four human sweepers are assigned to different zones or arrays of the sorting machine. Since some destinations will receive substantially more volume than others included in the sorting scheme or sub-scheme, one of the four sweepers may be taxed to the limit with an abundance of mail pieces, while the other three have little to do. To address this concern, one past approach has been to randomize the pocket destination code assignments so that concentrations of mail to related ZIP codes will not be clustered together with the same sweeper. This approach is not always effective, and by introducing a random pattern in the sorted output, makes errors harder to detect in the trayed output.

Mail once swept from the pockets must be transferred to trays for further processing. Such trays are arranged on racks with rows and columns of bins or compartments. A human worker takes the swept mail pieces and places them into a designated tray in an associated compartment. A full tray is then removed from the tray rack for further processing. In presently practiced sorting systems of this sort, no attention has been paid to improving the efficiency or ergonomics of this transfer operation, particularly for three-dimensional pocket arrays on single or multi-sided machines.

SUMMARY OF THE INVENTION

According to a first aspect of the invention, it is determined in advance for a given sort scheme or sub-scheme the number of mail pieces to be sorted to each pocket having an associated destination code or grouping of codes. Given this information, pockets are assigned associated destination codes in a manner which approximately equalizes the number of mail pieces to be sorted to each of a plurality of predetermined pocket array zones for which a single sweeper (human or robotic) is assigned. In this manner, the process ensures that no one zone will receive a disproportionate number of mail pieces, thereby improving overall efficiency and avoiding overloading a human worker. The robotic sweeper may become more efficient by optimizing its motions.

In one such process for sorting mail pieces, a sorting machine is used having a first array of pockets and a second array of pockets physically separate from the first array of pockets. The first and second arrays are swept of mail pieces by separate sweepers. The number of mail pieces sorted to each array are equalized in order to equalize the volume of mail pieces swept by each sweeper. In particular, where each pocket corresponds to a destination code and a total number of mail pieces per destination code is known in advance for each sort scheme to be carried out on the sorting machine, the equalizing step involves assigning destination codes to specific pockets to different sweeper zones in a manner that equalizes the volume of mail pieces swept by each sweeper, though the number of pockets/sweeper zone may not be equal.

According to a second aspect of the invention, the specific location of a pocket within each sweeper zone and the compartment for the corresponding tray on the storage rack are assigned based on ergonomic parameters. In particular, the system seeks to minimize the difference in vertical movement between the sorter pocket and its associated tray compartment for pockets for common destination codes. The number of physically cumbersome transfers (e.g., from a high pocket to low tray or a low pocket to a high tray) is kept at a minimum to increase speed and reduce fatigue. For robotic systems, the "master" process planner optimizes the "slave" robot by using array schemes to increase robot throughput by motion and time to sweep, based in part on robot characteristics.

In one process according to this second aspect of the invention, mail pieces are sorted to pockets in a vertically and horizontally extending array, wherein each pocket corresponds to one or more destination codes in a sort scheme. Mail is swept from the pockets to trays stored on a vertically and horizontally extending rack having rows and columns of bins containing trays. The number of mail pieces associated with each destination code in the sort scheme is determined, and destination codes are assigned to pockets and to trays at specific positions on the rack in a manner that minimizes the amount of vertical travel in sweeping sorted mail from the pockets and moving it to its designated tray. For purposes of the invention, it will be understood that the word "minimizes" is a relative term dependent on the degree of efficiency desired, and does not require total or absolute minimization. In a preferred embodiment, the rack is divided into a plurality of vertical tiers which receive mail from different sort schemes or sub-schemes, and destination codes are assigned to pockets and to trays at specific positions on the rack in a manner that minimizes the amount of sweeper travel, vertical or horizontal, in sweeping sorted mail from the pockets over all of the sort schemes. In another aspect of the invention, destination codes may be assigned to pockets and trays at specific positions on the rack in a manner that minimizes the amount of mail swept to trays in the highest and lowest rows of the rack.

The first and second aspects of the invention, especially when used in combination, greatly improve the ergonomics or robotic throughput of the sweeping operation. These and other features of the invention, including systems for carrying out the foregoing processes, are discussed in the detailed description which follows.

A third aspect of the present invention uses a priori or first pass data to create sort schemes which minimize the time items spend in the machine by creating pocket array zones which have zones near the input end of the machine receiving more volume than zones, for example, at the far end. Effective throughput is increased because high volume pockets at the near front end receive the most items, thus reducing the physical distance traveled in the sorter, minimizing the chance for jams or stoppages. Since higher volume sorts or destinations can exit the machine sooner, the mail items scheduled for secondary sorts can be recirculated to the feeder or transported to secondary sorting machines sooner, reducing dwell or delay time in a multiple machine plant in the latter case, and making possible for the first time plant optimization using this process improvement. This third aspect is also disclosed in the following.

All aspects apply to scheme development for not only a priori information but also secondary or tertiary sort schemes. Hence schemes and, consequently, overall system performance are optimized based on process analysis using first or primary pass derived information, or a priori information, or both.

DESCRIPTION OF THE DRAWINGS

In the accompanying drawings, wherein like numeral denote like elements.

DETAILED DESCRIPTION

Figure 1:
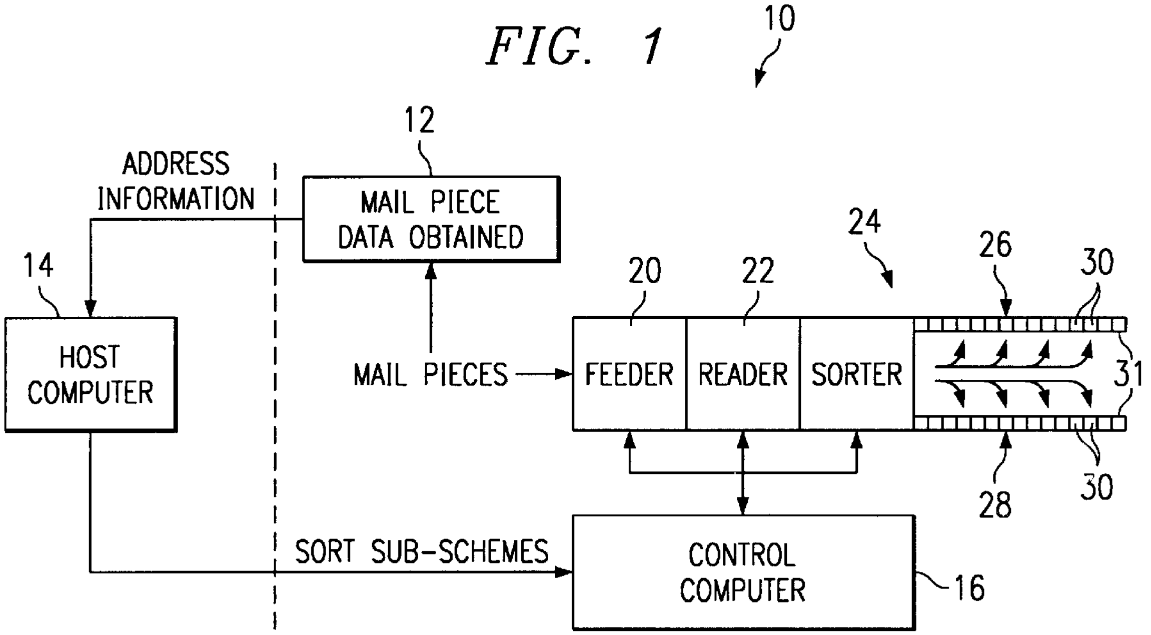
FIG. 1 illustrates a mail sorting system of the type used in a process in accordance with the invention.

FIG. 1 illustrates a mail sorting system 10 of the type used in the present invention. Such a system is disclosed in detail in U.S. Pat. No. 5,893,464, the entire contents of which are incorporated by reference herein for all purposes. For purposes of the invention, "mail pieces" include letters, magazines, other flats, and similar items which can be sorted and stacked in trays. Address or bar code information is obtained for a group or batch of mail pieces by a input 12. This information is then transferred to a host computer 14. The host computer 14 stores the mail piece address or bar code information in memory and uses the address or bar code information from the mail pieces to generate one complete sort scheme. This sort scheme may contain numerous sort sub-schemes. The sort sub-schemes are then transmitted to a control computer 16. Computer 16 controls the subsequent feeding, reading and sorting process of the mail pieces.

During a selected sort sub-scheme process, a batch (or group) of mail pieces associated with the selected sub-scheme is fed into a feeder 20. The feeder 20 singulates the mail pieces for individual feeding into a reader 22. The reader 22 reads the address or bar code information from each mail piece as it passes through the reader to determine if that mail piece belongs with the selected sub-scheme. A sorter 24 sorts the mail piece according to the selected sort sub-scheme. The sorter 24 includes a plurality of destination pockets or bins 30 having entry openings 31. Pockets 30 are organized into a first array of pockets 26 and a second array of pockets 28, which may be disposed in spaced, opposing rows as shown in FIG. 1. As will be appreciated, the destination pockets 30 may be divided into any number of arrays or groups, and may contain any number of individual pockets 30.

After all the mail pieces for a selected sort scheme or sub-scheme have been sorted to the selected sub-scheme pockets, a sweep operation is performed to sweep the mail pieces out of the pockets in order to perform another sort on a different batch or group of mail pieces. A process in accordance with the present invention may sort a batch of mail pieces in accordance with a first sort sub-scheme into a selected first array of pockets 26, and during the sweep operation of the first array of pockets 26, begins sorting a second batch or group of mail pieces into a selected second array of pockets 28 different from the first array of pockets 26. Accordingly, the sorter 24 sorts a batch of mail pieces to a first group of pockets and, instead of shutting down to sweep all the pockets (as is in conventional sorting processes), the sorter 24 sorts a second batch of mail pieces using a second sort sub-scheme into a different group of pockets concurrently with the sweeping of mail pieces from the first group of pockets. The sort scheme and sub-schemes are generated by a computer program, such as software sold under the trademark SORTGEN by Siemens ElectroCom, L.P. Alternatively, other available programs could generate a sort scheme to meet any set of desired user parameters. The sorting software may utilize sub-schemes, as in the case of SORTGEN, or single sort schemes designed to accomplish complete sorting in which there is no need to alternate between pocket arrays on a given machine.

Figure 2:
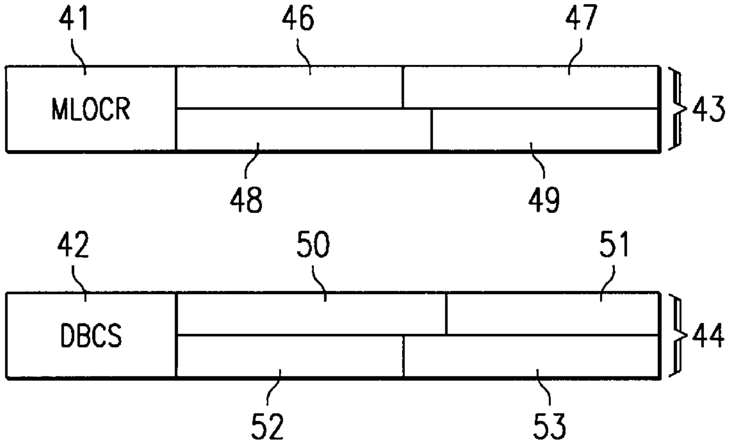
FIG. 2 illustrates sweeper assignment zones according to the invention.

Referring to FIG. 2, a typical sorting installation for a letter shop or mass mailer often includes several sorters which may be of different types, i.e. a MLOCR machine 41 capable of handling both bar coded and non-bar coded mail, and a DBCS machine 42 capable of sorting pre bar-coded mail only. Sorter pocket arrays 43, 44 associated with each machine 41, 42 are each divided into four sweeper zones or groups 46–49 and 50–53, respectively. Each zone 46–53 is swept by a human operator or sweeper.

A predetermined algorithm is used to balance out the number of mail pieces sorted to each zone 46–53. This balance may be calculated based on the total mail pieces for each single machine 41 or 42, or may be optimized over the entire installation (in this case, over both machines 41, 42)

so that all eight of the zones shown receive a very nearly equal number of mail pieces as possible. This can be accomplished in part because a mass mailer or letter shop knows in advance the zip codes for the mail pieces in each sorting run, and the number of mail pieces going to each code included in the run can be determined in advance.

An algorithm is selected to determine pocket assignments on each machine. For example, according to one such algorithm, a set of four combinations for four zones is determined by first ranking destination codes in order of total mail pieces from most to least, assigning the top four to a pocket in each of four different groups 46–49 or 50–53, then assigning additional groups in descending order on the basis of whichever group currently has fewest total mail pieces until all assignments have been made. In the alternative, if very high accuracy is required, a computer system can calculate and compare a large number of possible combinations, or all possible combinations for a given run, and then select the one which results in the least difference between the group with the most mail pieces and the least mail pieces. Even in a setting where robotic units replace human sweepers, there are obvious advantages to optimizing the number of mail pieces sorted to each zone.

In the context of a SORTGEN sub-scheme, it may be, for example, that zones 46, 47 are swept completely out while zones 48, 49 are being sorted to, and that zones 48, 49 are swept completely out while zones 46, 47 are being sorted to. However, since pockets are generally assigned one to a code or group of codes, human sweepers may be busy sweeping a pocket that has become full even during a sorting run. It is thus important to operations that the busiest pockets are not, by chance or by design, grouped in the same sweeper zone.

Figure 3:
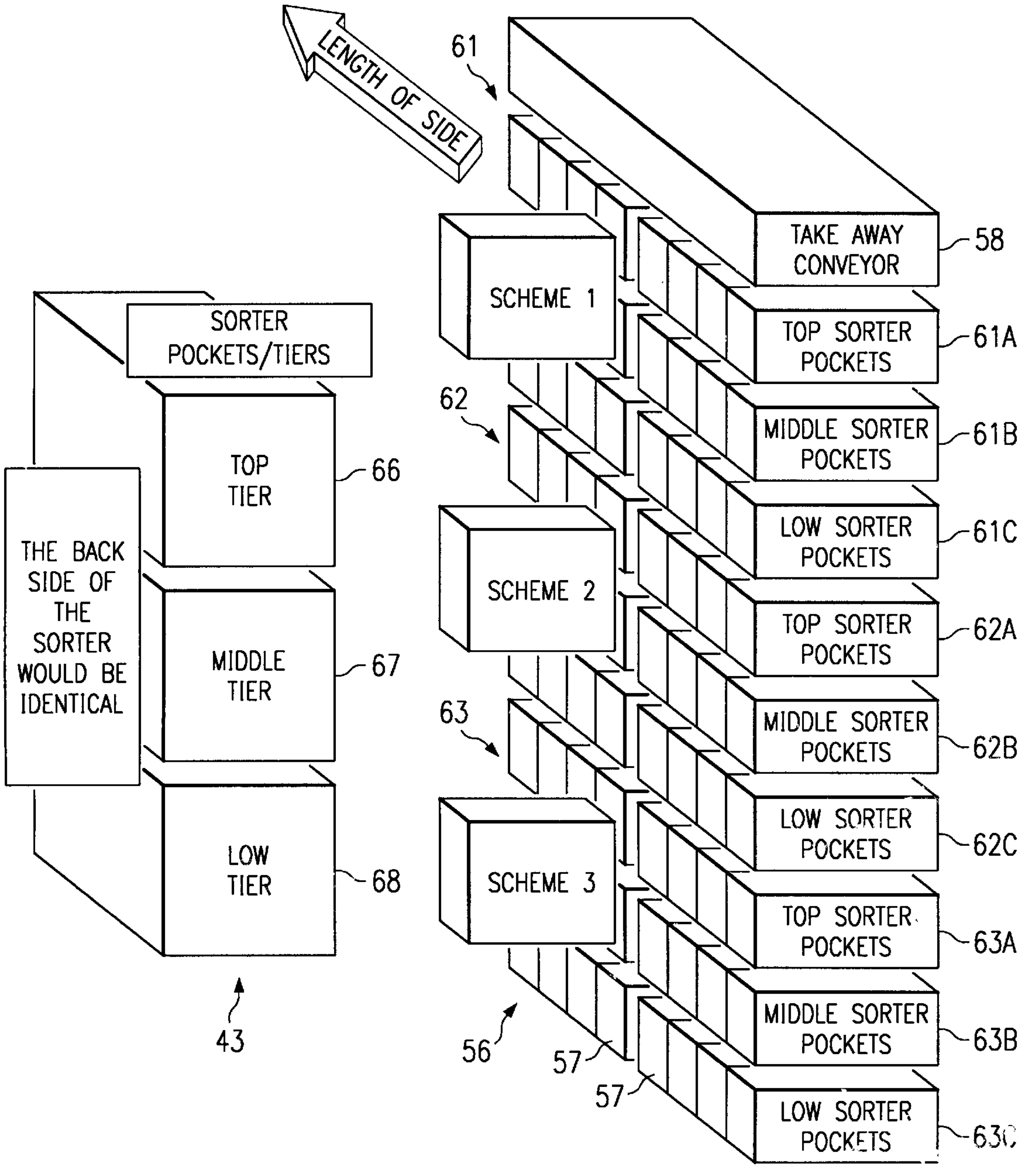
FIG. 3 illustrates a sorter pocket and tray rack layout according to the invention.

Referring now to FIG. 3, the sweeper's task is to take the mail swept from the sorter pocket array 43 (or 44) and move it to a specified conventional mail handling tray set on a rack 56. For this purpose, a "tray" is any sort of flat-bottomed, open container, and includes cartridges of the type which can be opened or transported by a machine that mechanically interfaces with the cartridge. The rack 56 is divided into rows and columns of open-ended compartments 57 each storing a tray, and adjoins a conventional tray takeaway conveyor 58 for transporting fall trays. A top zone 61 consisting of the uppermost rows of the rack 56 is associated with a first sort scheme or sub-scheme to be run on the associated sorting machine 41 or 42, a middle zone 62 consisting of the middle rows of rack 56 is associated with a second sort scheme or sub-scheme, and a lower zone 63 consisting of the lowermost rows of rack 56 is associated with a third sort scheme or sub-scheme. The pockets of the array 43 are similarly divided into upper, middle and lower zones or tiers 66, 67 and 68, respectively. Tiers 66–68 extend the length of the array 43 and as such cover all (both) sweeper zones 46, 47 on that side.

Tray assignments, which are conventionally designated by labels, are made by taking into account the ease or difficulty of moving mail from the pocket to the tray, taking into account the elevation of each. Generally, transfers from a low pocket to a low tray or from a high pocket to a high tray are difficult and should be avoided to the extent possible. Similarly, a transfer from a low pocket to a high tray is considered difficult. Overall, optimization may be based on minimizing the vertical movement between the origin pocket and the destination tray, favoring descending paths over ascending ones where possible, while trying to minimize the difficult low to low or high to high transfers.

As shown in FIG. 3, according to one example of the foregoing principles, during the first sort scheme when the upper tier 61 receives mail, mail from top tier 66 goes to trays in a highest row (or rows) 61A, mail from middle tier 67 goes to trays in a middle row (or rows) 61B, and mail from bottom tier 68 goes to trays in a lowest row (or rows) 61C. Since the number of mail pieces per sorter pocket is known for any given sort scheme, pocket assignments within zones 46, 47 may be made based on height in the sort scheme to maximize the number of mail pieces moved from middle tier 67 to middle row 61B, since this involves the least vertical change. Conversely, pocket assignments within zones 46, 47 are made to minimize the number of mail pieces moved from upper tier 66 to upper row 61A, since this is a difficult transfer for a human worker. After these assignments are made, a middle group of mail pieces, representing pockets receiving intermediate numbers of mail pieces, is assigned to pockets in low tier 68 for transfer to lowest row 61C. In this manner, the effort involved in moving mail from the sorter pockets to the upper tier 61 of rack 56 is minimized.

The second sort scheme in this illustration uses middle tier 62. As before, mail from high tier 66 goes to trays in a highest row (or rows) 62A, mail from middle tier 67 goes to trays in a middle row (or rows) 62B, and mail from low tier 68 goes to trays in a lowest row (or rows) 62C. Pocket assignments within zones 46, 47 maximize the number of mail pieces moved from low tier 68 to lower row 62C. Top row 62A receives the fewest mail pieces, and middle row 62B receives the intermediate number of mail pieces.

During the third sort scheme using the low rack zone 63, mail from high tier 66 again goes to trays in a highest row (or rows) 63A, mail from middle tier 67 goes to trays in a middle row (or rows) 63B, and mail from low tier 68 goes to trays in a lowest row (or rows) 63C. Pocket assignments within zones 46, 47 are made in order to reverse the order of frequency used for top tier 61, namely to maximize the number of mail pieces moved from top tier 66 to upper row 63A and minimize the low-to-low transfer from low tier 68 to low row 63C. Middle row 63B receives the intermediate number of mail pieces from middle tier 67. In this manner, considering all three sort schemes together, as many mail pieces as possible are swept to trays at intermediate heights, and as few as possible are swept to trays on the highest and lowest rows 61A, 63C.

No complex algorithm for assigning pockets in tiers 66–68 is required. During the first scheme, for example, the system after deciding which zip codes will be assigned to which sweeper zones 46, 47, etc. then assigns specific pockets within each zone based on the foregoing strategy in descending order. The pockets in zone 46 with the highest number of mail pieces would be assigned to the middle tier 67, and when those spaces are no longer available, assignments would continue to low tier 68 and conclude with top tier 66. A similar series of assignments would be made for the second and third schemes, taking into account the differences discussed above. Even where a robotic unit such as an automated storage and retrieval system (ASRS) replaces a human sweeper, the process of the invention will reduce overall energy consumption and wear on the ASRS and increase the overall speed at which the system can operate.

Although several embodiments of the present invention have been described in the foregoing detailed description and illustrated in the accompanying drawings, it will be understood by those skilled in the art that the invention is not limited to the embodiments disclosed but is capable of numerous rearrangements, substitutions and modifications without departing from the spirit of the invention.

What is claimed is:

1. In a process for sorting mail pieces with a sorting machine having a first array of pockets and a second array of pockets physically separate from the first array of pockets, which first and second arrays are swept of mail pieces by separate sweepers, the improvement which comprises equalizing the number of mail pieces sorted to each array in order to equalize the volume of mail pieces swept by each sweeper.

2. The process of claim 1, wherein each pocket corresponds to a destination code and a total number of mail pieces per destination code is known in advance for each sort scheme to be carried out on the sorting machine, and the equalizing step comprises assigning destination codes to specific pockets in different sweeper zones in a manner that equalizes the volume of mail pieces swept by each sweeper.

3. In a process for sorting mail pieces with a sorting machine, including the steps of sorting mail pieces to pockets in a vertically and horizontally extending array, wherein each pocket corresponds to one or more destination codes in a sort scheme, and sweeping sorted mail from the pockets to trays stored on a vertically and horizontally extending rack having rows and columns of compartments containing trays, the improvement which comprises:

determining the number of mail pieces associated with each destination code in the sort scheme;

assigning destination codes to pockets and to trays at specific positions on the rack in a manner that minimizes the amount of vertical travel in sweeping sorted mail from the pockets and moving it to its designated tray.

4. The process of claim 3, wherein the rack is divided into a plurality of tiers which receive mail from different sort schemes, further comprising assigning destination codes to pockets and to trays at specific positions on the rack in a manner that minimizes the amount of vertical travel in sweeping sorted mail from the pockets over all of the sort schemes.

5. The process of claim 4, wherein the tiers include an uppermost tier and a lowermost tier, further comprising the steps of:

during one sort scheme, sweeping mail pieces from the pockets to trays in the uppermost tier;

during another sort scheme, sweeping mail pieces from the pockets to trays in the lowermost tier.

6. The process of claim 5, wherein during the one sort scheme, an uppermost row of the uppermost tier receives the fewest mail pieces.

7. The process of claim 6, wherein during the other sort scheme, a lowermost row of the lowermost tier receives the fewest mail pieces.

8. In a process for sorting mail pieces with a sorting machine, including the steps of sorting mail pieces to pockets in a vertically and horizontally extending array, wherein each pocket corresponds to a destination code in a sort scheme, and sweeping sorted mail from the pockets to trays stored on a vertically and horizontally extending rack having rows and columns of compartments containing trays, the improvement which comprises:

determining the number of mail pieces associated with each destination code in the sort scheme;

assigning destination codes to trays at specific positions on the rack in a manner that minimizes the amount of mail swept to trays in the highest and lowest rows of the rack.

9. A system for sorting mail pieces, comprising:

a sorting machine having a first array of pockets and a second array of pockets physically separate from the first array of pockets, which first and second arrays are swept of mail pieces by separate sweepers; and means for equalizing the number of mail pieces sorted to each array in order to equalize the volume of mail pieces swept by each sweeper.

10. A system for sorting mail pieces, comprising:

a sorting machine that sorts mail pieces to pockets in a vertically and horizontally extending array;

a vertically and horizontally extending rack having rows and columns of compartments containing trays for receiving mail pieces swept from the pockets of the sorting machine;

means for determining the number of mail pieces associated with a destination code in a sort scheme; and means for assigning destination codes to trays at specific positions on the rack in a manner that minimizes the amount of mail swept to trays in the highest and lowest rows of the rack.

11. A system for sorting mail pieces, comprising:

a sorting machine that sorts mail pieces to pockets in a vertically and horizontally extending array;

a vertically and horizontally extending rack having rows and columns of compartments containing trays for receiving mail pieces swept from the pockets of the sorting machine;

means for determining the number of mail pieces associated with each destination code in the sort scheme; and means for assigning destination codes to pockets and to trays at specific positions on the rack in a manner that minimizes the amount of vertical travel in sweeping sorted mail from the pockets.

* * * * *